United States Patent [19]

Siekmann

[11] Patent Number: 4,657,569
[45] Date of Patent: Apr. 14, 1987

[54] EQUIPMENT FOR THE GENERATION OF CAVITATION

[75] Inventor: Helmut E. Siekmann, Hermannstrasse 3A, 1000 Berlin 37/Zehlendorf (West), Fed. Rep. of Germany

[73] Assignees: Uhde GmbH, Dortmund; Helmut E. Siekmann, Berlin, both of Fed. Rep. of Germany

[21] Appl. No.: 761,186

[22] Filed: Jul. 31, 1985

[30] Foreign Application Priority Data

Aug. 2, 1984 [DE] Fed. Rep. of Germany ....... 3428540

[51] Int. Cl.⁴ ............................................. B01D 19/00
[52] U.S. Cl. ....................................... 55/189; 55/195; 210/718; 210/800
[58] Field of Search ................. 55/36, 46, 52, 55, 189, 55/194, 195; 210/718, 800, 801; 203/DIG. 19

[56] References Cited

U.S. PATENT DOCUMENTS 3,163,508 12/1964 Tuck et al. .............................. 55/52
3,344,584 10/1967 Kehoe et al. ........................... 55/46
3,345,803 10/1967 Smith ...................................... 55/55
3,660,285 5/1972 Markel ................................. 210/800
4,002,440 1/1977 Saari ................................. 55/55 X
4,216,089 8/1980 Boon et al. ......................... 210/718

FOREIGN PATENT DOCUMENTS 0670327 9/1963 Canada ................................. 55/195
0039571 3/1977 Japan .................................. 55/189
0498799 1/1939 United Kingdom ................... 55/55

Primary Examiner—Charles Hart
Attorney, Agent, or Firm—Toren, McGeady & Goldberg

[57] ABSTRACT

Apparatus for generation of cavitation within a flowing liquid, wherein expenditure for equipment for purposeful generation of cavitation and control of the cavitated liquid portion can be achieved by passing the liquid from a high-level reservoir through a downwardly flowing path which includes an outlet nozzle, at least one pipe bend connected to the outlet nozzle and a drop-pipe with a control valve in the vicinity of the lower end of the drop-pipe.

6 Claims, 1 Drawing Figure

U.S. Patent    Apr. 14, 1987    4,657,569
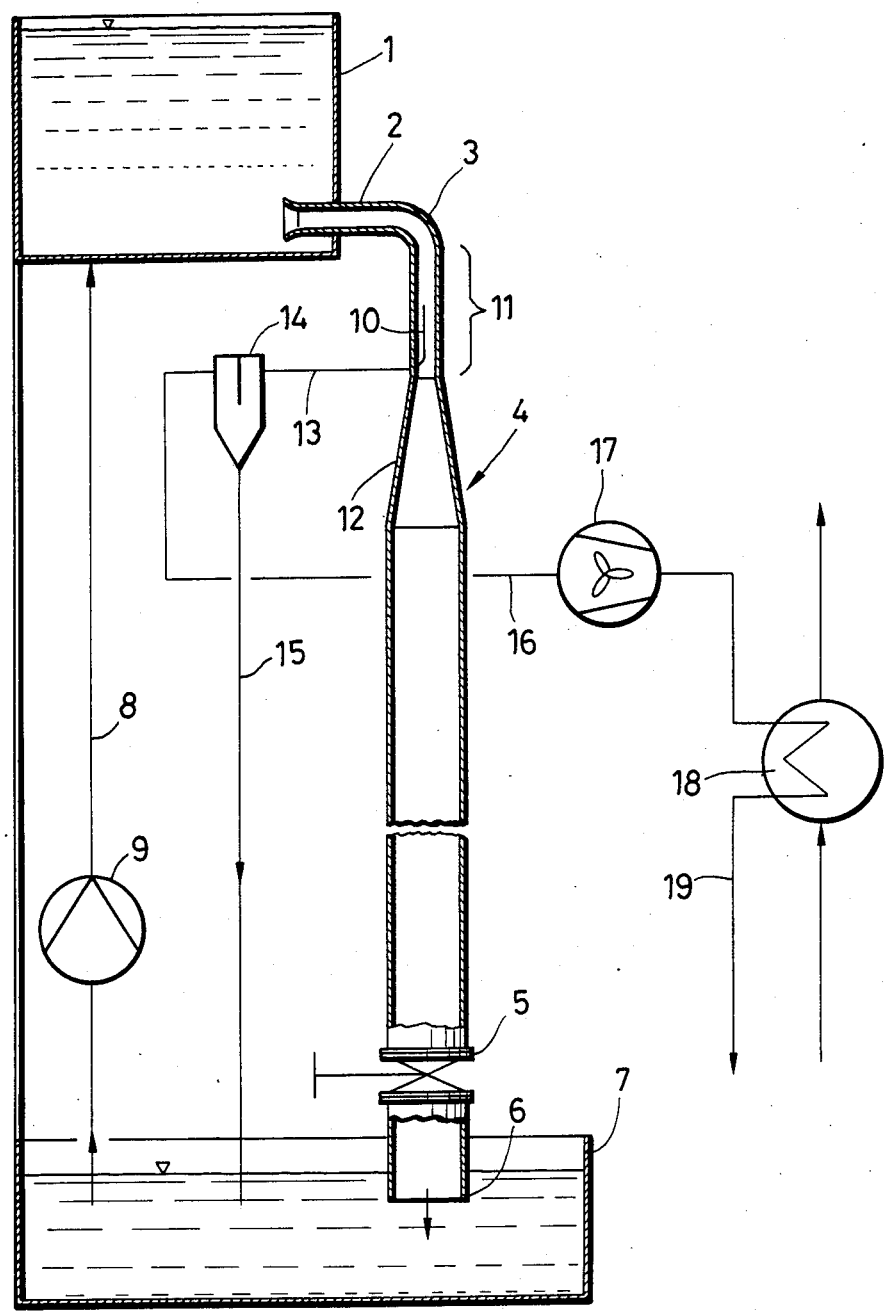

EQUIPMENT FOR THE GENERATION OF CAVITATION

The invention relates to equipment for the generation of cavitation within a flowing liquid.

The boiling point of liquids is strongly dependent on pressure. The boiling temperature drops with decreasing pressure. Under strong vacuum, such as may occur at high velocities, or when ambient pressure drops, pressure can decrease locally to boiling. Such conditions frequently occur in hydrodynamic flow machines, such as pumps, turbines, propellers, for instance when turbine blades are passed, etc. This results in what is known as cavitation. In it, vapor and gas-bubbles are released from the liquid and cause the formation of voids. A subsequent pressure rise is accompanied by rapid collapse of the bubbles, so-called impact condensation, (E. Truckenbrodt, "Steuerungsmechanik", Springer Verlag 1968, Page 15 or Dubbel "Taschenbuch für den Maschinebau", Springer Verlag 1983, Page 893).

Although this phenomenon is in many cases undesirable owing to the possibility of erosion of the material around which flow takes place, and also due to the considerable noise caused by cavitation, it may be usefully applied in other cases, in particular, for instance, as an aid in the destruction of germs in waste water. DE-PS No. 24 55 633 deals with this.

In this known process, such an amount of sonic energy is introduced into the water zones with sufficient ozone concentration for the destruction of germs that cavitation occurs, permitting the attainment of an increase in the germicidal effects of the ozone in the waste water. These familiar means of generating cavitation by means of sonic energy involve a high degree of equipment complexity and investment. A method is also known for generating cavitation by means of a cavitator, which can essentially be compared to a centrifuge. This is also a relatively complex and expensive solution. Also known are caviatation generators using vibrating pistons (magnetostriction) which function on the bais of ultra-sonic energy.

SUMMARY OF THE INVENTION

It is intended that equipment for generation of cavitation within a flowing liquid, expenditure for equipment for purposeful generation of cavitation and control of the cavitated liquid portion can be achieved.

This is achieved by the fact that the equipment features a high-level reservoir, an outlet nozzle, at least one pipe bend connected to the outlet nozzle, and a drop-pipe and control valve in the vicinity of the end of the drop-pipe.

The object of the invention is to provide a solution with which in particular the expenditure for equipment for purposeful generation of cavitation and control of the cavitated liquid portion can be achieved.

With equipment of the type initially described, this problem is solved in accordance with the invention in that it comprises a high-level reservoir, an outlet nozzle, at least one pipe bend connected to the outlet nozzle, and a drop-pipe with a control valve in the vicinity of the end of the drop-pipe.

This equipment is comparatively simple, but very effective. Using it, it is in particular possible to control the formation of the cavitation by means of very simple design measures and to adapt it to respective requirements.

An essential feature of the invention is a design for the equipment featuring mechanisms for withdrawal and/or separation of the cavitation partial flow from the main flow in the vicnity of the drop-pipe downstream of the pipe bend. This measure permits the equipment to be used for a multitude of applications. For instance, the use of these internals can make it possible to withdraw readily volatile matter in the cavitation area, where they are enriched to a high degree, and to pass them to further processing or disposal. In the same way, such equipment can also be used, for instance, for the distillation of fluid mixtures, when, for instance, chlorinated hydrocarbons with closely adjacent boiling points are to be separated.

The invention also provides for the diameter of the drop-pipe to become larger downstream of the separation internals. In principle, this area could commence at the point where the internals are installed. However, expansion of diameter below this point permits the pressure to be increased purposefully in such a way that the cavitation occurs in the required form.

The invention also provides for the installation in series and/or in parallel of a number of pipe bends with connected drop-sections with separation equipment for respective cavitated flow portion. Such a succession of pipe bends and drop-sections permits the withdrawal of whole ranges of media, or the subjection of a volume of flow to be treated to a very high degree to the respective cavitation areas.

It may also be purposeful to install below the drop-pipe a collecting basin and pump mechanism for return of the liquid to the high-level reservoir. This would be particularly useful where the liquid to be treated is to be subjected several times to cavitation treatment.

The invention also provides for installation of liquid separators and/or vapour compressors and/or condensers for the purpose of further treatment of the cavitated flow portion withdrawn from the main flow, these plant components being selected in particular in accordance with the type of liquids to be treated and the processes to be implemented.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described a preferred embodiment of the invention.

BRIEF DESCRIPTION OF THE DRAWINGS

In the drawings:

FIG. 1 shows the equipment in accordance with the invention.

DETAILED DESCRIPTION OF THE PREFERRED EMBODIMENT

In the example shown, a high-level reservoir 1 is equipped with a horizontal outlet nozzle 2, which empties via a pipe bend 3 into a drop-pipe designated as 4.

Drop-pipe 4 is installed in the direction of gravity flow and has a control valve 5 at its lower end. Drop-pipe 4 empties with its extraction opening 6 into a collecting basin 7. From collecting basin 7, a return line 8 leads via a pump 9 back to the high-level reservoir 1.

Essential features of the invention are pipe bend 3, and equipment 10 directly downstream of pipe bend 3 in a vertical pipe section, which is intended to represent the cavitation section and which is designated with a bracket 11. Cavitation conditions already exist upstream of pipe bend 3, but separation of the vaporous and liquid partial flow cannot be achieved ahead of the pipe bend, due to the radial pressure drop. Drop-pipe 4 tapers out in a funnel shape downstream of equipment 10, for instance baffle plates with extraction nozzles. This area has been designated 12.

As already mentioned, equipment 10 is fitted with an exhaust line 13, which empties in the example shown into a liquid separator 14. The liquid separated is passed via line 15 to collecting basin 7. The treated vapors are passed in the example shown via 16 to a vapor compressor 17, thence to a heat exchanger or condenser 18. Condensate discharge is designated 19.

The variants of the invention described naturally can be modified in many respects, without departing from the basic idea. The invention is thus, in particular, not restricted to any specific cross-sectional shape, particularly with regard to the pipe bend and drop-pipe. For this purpose, a circular cross section customary for pipes can be selected, just as can an oval, angular, or polygonal shape. Nor must the bend in the pipe bend necessarily be the same as shown in the illustration. The 90° deflection can be replaced by any deflection ranging from 45° to 135°.

What is claimed is:

1. Apparatus for the generation of cavitation within a flowing liquid, comprising a high-level reservoir containing said liquid, and means defining a flow path extending vertically downward from said reservoir for said liquid, said means comprising an outlet nozzle from said reservoir, at least one pipe bend connected to said outlet nozzle and a drop-pipe and control valve in the vicinity of a lower end of said drop-pipe.

2. Apparatus according to claim 1, wherein items of equipment for withdrawal and/or separation of the cavitated flow portion from a main flow of said liquid are installed in the vicinity of said drop-pipe downstream of said pipe bend.

3. Apparatus according to claim 2, further including separation internals wherein said drop-pipe has a diameter which becomes larger downstream of said separation internals.

4. Apparatus according to claim 3, wherein a number of said pipe bends with a connecting drop-section with items of said separation equipment for the respective cavitated portion of the flow are installed in series and/or in parallel.

5. Apparatus according to claim 4, wherein a collecting basin and a pump mechanism for returning of liquid to said high-level reservoir are installed below said drop-pipe.

6. Apparatus according to claim 2, wherein liquid separators and/or vapor compressors and/or condensers are installed for the purpose of further treatment of the cavitated flow portion withdrawn from said main flow.

* * * * *